United States Patent
Hughes et al.

(10) Patent No.: US 10,074,138 B2
(45) Date of Patent: Sep. 11, 2018

(54) SYSTEM AND METHOD FOR VALUATION, ACQUISITION AND MANAGEMENT OF INSURANCE POLICIES

(71) Applicant: Risk Transfer IP, LLC, Orlando, FL (US)

(72) Inventors: Paul R. Hughes, Orlando, FL (US); Dino A. Fabrizio, Davenport, FL (US)

(73) Assignee: RISK TRANSFER IP, LLC, Orlando, FL (US)

( * ) Notice: Subject to any disclaimer, the term of this patent is extended or adjusted under 35 U.S.C. 154(b) by 166 days.

(21) Appl. No.: 14/243,265

(22) Filed: Apr. 2, 2014

(65) Prior Publication Data

US 2015/0100353 A1 Apr. 9, 2015

Related U.S. Application Data

(60) Provisional application No. 61/886,128, filed on Oct. 3, 2013.

(51) Int. Cl.
*G06Q 40/08* (2012.01)

(52) U.S. Cl.
CPC .................. *G06Q 40/08* (2013.01)

(58) Field of Classification Search
CPC ...................................... G06Q 40/08
USPC .............................................. 705/4
See application file for complete search history.

(56) References Cited

U.S. PATENT DOCUMENTS

| | | | |
|---|---|---|---|
| 8,177,121 B2 | 5/2012 | Zimmerman et al. | |
| 8,224,678 B2 | 7/2012 | Paradis et al. | |
| 8,315,938 B1 | 11/2012 | Forsythe | |
| 8,442,845 B2 | 5/2013 | LeBlanc et al. | |
| 8,463,699 B2 | 6/2013 | Karlinski, III et al. | |
| 2009/0030795 A1 | 1/2009 | Winchester et al. | |
| 2009/0132298 A1* | 5/2009 | Benward | G06Q 40/08 705/4 |
| 2010/0332294 A1 | 12/2010 | Geis et al. | |
| 2012/0123806 A1* | 5/2012 | Schumann, Jr. | G06Q 40/08 705/4 |
| 2013/0046560 A1* | 2/2013 | Theus | G06Q 10/10 705/4 |
| 2013/0124233 A1* | 5/2013 | Walker | G06Q 40/00 705/4 |

OTHER PUBLICATIONS

International Search Report and Written Opinion from PCT/US2014/059133 dated Jan. 21, 2015.
Business Intelligence—Visualization, Reporting, Dashboards / Domo; www.domo.com, Jun. 18, 2014.

(Continued)

*Primary Examiner* — Robert R Niquette
*Assistant Examiner* — Liz P Nguyen
(74) *Attorney, Agent, or Firm* — Allen, Dyer, Doppelt + Gilchrist, P.A.

(57) ABSTRACT

A system and method for the valuation, acquisition, and management of insurance policies whereby specific business methods, algorithms, and systems are utilized to measure specific benchmarks set by risk bearers, affiliates and clients. The benchmarks set are based on the ratios set by the risk bearer based on their specific objectives for profitability. Profitability is measured by a number of factors and ratios to include but not be limited to ROI, ROE, Combined Ratio, Expense Ratio, Loss Ratio.

17 Claims, 10 Drawing Sheets

(56) References Cited

OTHER PUBLICATIONS

Verisk Analytics—The Science of Risk; www.verisk.com, Jun. 18, 2014.
UTube Video "Valen Analytics Solution Whiteboard;" https://www.youtube.com/watch?v=NE5ZU9fUnKU&feature=youtu.be&__hssc=&__hstc&hsCtaTracking=90f60838-eb08-4929-be90-fb9f4c0c3db4%7C4e0b60c1-0dbc-4ea9-bb5a-771ba6da0470, Jun. 18, 2014.

* cited by examiner

SYSTEM AND METHOD FOR VALUATION, ACQUISITION AND MANAGEMENT OF INSURANCE POLICIES

CROSS-REFERENCE TO RELATED APPLICATIONS

This application claims priority to provisional U.S. patent application entitled "System and Method for Valuation, Acquisition and Management of Insurance Policies," filed Oct. 3, 2013, having Ser. No. 61/886,128, the disclosure of which is hereby incorporated by reference in its entirety.

BACKGROUND OF THE INVENTION

In underwriting insurance policies, the management of risk exposure and cost are essential to the profitability of the risk bearer. Risk bearers, or those responsible and/or impacted by the profitability of a risk bearer, can be reinsurers, primary insurance carriers, managing general underwriters ("MGU's"), managing general agents ("MGA's"), third party administrators ("TPA's"), program administrators, retail insurance agents and the respective clients and/or buyers of insurance.

Profitability of risk bearers, their affiliates, and clients is based on a number of different ratios and factors. For a reinsurer or primary insurance carrier, for example, the main measurement is what is known as a "Combined Ratio." It is calculated according to the National Council of Compensation Insurance ("NCCI") as a measure of the extent to which premium income covers a company's losses and expenses determined by adding together a company's loss ratio and its expense ratio. In addition to the unpredictability of a loss incident occurring and impacting the loss ratio, a number of other factors hinder the ability of risk bearers to accurately project loss and ultimately help them manage their portfolios.

It is the current practice of risk bearers, their affiliates and clients to establish a projection of liabilities and premiums to offset those liabilities at policy inception based on the characteristics of a given exposure. Risk bearers, their affiliates and clients consider the underlying risks such as expected payrolls, premium job classifications, state of employment, loss experience and other subjective considerations in setting expected premiums and expenses to offset expected losses. The profitability of the given risk is then set by the actuarial and underwriting units of the risk bearer for a period of twelve months.

Sophisticated models have been developed, based upon credible data pools, for use in generating these projections of liability and in projecting return on policyholder surplus. For example, the NCCI, currently the foremost actuarial resource and ratemaking authority in 36 states for workers' compensation, collects data for these 36 workers' compensation systems to better understand losses by occupation to then set the appropriate loss costs and rates charged for those occupations by primary insurance carriers and other risk bearers, their affiliates and clients. Other states perform these same functions independently of the NCCI, such as the Worker's Compensation Insurance Rating Board ("WCIRB") in California and the New Jersey Compensation Rating Insurance Board ("NJCRIB").

Due to the manner and timing of how workers' compensation insurance carriers report premiums, payrolls and losses to actuarial bureaus through unit statistical cards, data is not available until at a minimum 18 months after policy inception and every 12 months thereafter to understand the true combined ratio/profitability of the risk bearer. The visualization of trends and identification of outliers that impact combined ratio/profitability has always relied on retrospective rather than current data sources. As a result, the earliest information with any credibility is 18 months old at best and, due to other changes in the interim, potentially irrelevant to predicting what happens in the future on the line of insurance being contemplated.

Changes that occur during the twelve month policy period, such as rate changes, addition of locations and employees, payroll increases and decreases, job classification deviations, jurisdictional based changes or amendments and potential layoffs that may occur within the twelve month policy period, leads to potential pricing inadequacy because the denominator of the combined ratio/loss ratio, known as "earned premiums," is unknown. Earned premium as defined by the NCCI is the portion of the premium that represents coverage already provided and is equal to actual reported payrolls by state and class code divided by 100 and then multiplied by the actual rate set by the carrier by state. As a result, each day that an insurance policy is in force would be a day of earned premium. This void of knowledge regarding earned premiums is an instrumental historical problem that has plagued the industry and has made the actual analysis and tracking of the loss ratios and ultimately the profitability of risk bearers, their affiliates or clients in a timely manner virtually impossible.

Nonetheless, the practice of generating projections of losses based upon retrospective and potentially outdated exposure data is employed because there is currently no credible source of actual underlying premium exposure that can be used to measure anticipated losses expense 30 to 60 days prior to a policy effective/renewal date. Additionally, the inability to analyze loss expense data on a more frequent basis than the typical standard of monthly only adds further to the speed and access to data problem. Because of the foregoing limitations on available premium exposure data, the profitability of an insurance program can also only been measured retrospectively by the bearer(s) of risk for that given insurance program at minimum 18 months in arrears of the program inception.

The actuarial models that exist to better understand projected profitability stop at the establishment of loss selection and do not revisit profitability for at least 18 months thereafter. Actuarial science sets expected profitability by pricing the premiums of an insurance policy at a level where it is able to make the targeted profitability projections within a reasonable amount of certainty as set by the Chief Actuarial Officer, Chief Underwriting Officer or other insurance professionals that have been given the authority to bind the risk bearer, their affiliates and clients to the potential liabilities of a twelve month policy.

The actuarial fellow that sets initial guidance on an insurance carrier's portfolio of business or a specific account has nothing that is credible to understand profitability outside of expected losses until a premium audit is performed. The denominator known as earned premiums is not known. Premium audits are always performed after the policy expiration and are typically completed 6 months after the policy's expiration.

It is often the situation that existing projection models are inadequate for managing exposure or profitability for an individual company. By way of example, Professional Employer Organization's ("PEO's") which can effectively deliver products and services to a business of any size, historically have been the most attractive to small business owners. This has been the case because small business owners are more often unable to provide full time employees the same benefits to deal with important aspects of being an employer such as human resources, employer and employee compliance (ERISA, COBRA, FMLA etc), W-2 payroll administration and reporting, Federal and State payroll tax reporting, and, importantly, the procurement of employee related insurance plans (workers' compensation, employment practices liability, health, disability, life, 401K etc). With respect to workers' compensation insurance, the vast majority of PEO client companies provided such insurance are small companies that generate limited premiums and have relatively limited numbers of claims.

Because credible predictions of the future expectation of claims and associated loss expenses can only be obtained through the analysis of a larger data set of claims than what can be provided by smaller employers, i.e., hundreds to thousands of times the number of claims experienced by individual PEO clients, the ability to create a credible pricing model for a workers' compensation policy for the average PEO client company does not exist considering the lack of credibility of available data on an individual client basis. Thus, the way that a typical PEO client company is being priced and underwritten by the insurance marketplace is deficient and ultimately can and often does impact the profitability of risk bearers, their affiliates and clients.

As a result of the foregoing, the issuance of policies to PEO's have often been based on composite rates as a function of the established rating basis versus premium and understated ultimate expected losses and therefore the collateral needed to offset them. Because the same limited client data is used to evaluate the profitability of PEO policies, these policies have also suffered insufficient rate setting and inadequate supervision of premium growth. There have also been insufficient controls and direction to ensure that the product provided to the PEO was beneficial to all involved in the transaction. While administratively easier, this methodology has created the inability for the risk bearer, their affiliates and clients to know the underlying premium base offsetting expected losses.

What is needed therefore is a system and apparatus for allowing risk bearers, their affiliates and clients in an insurance environment, the ability to more accurately forecast and manage risk exposure, the ability to better set rates and pricing for the acquisition of an asset, and to continually and consistently measure the profitability of the asset as set by the bound insurance policy in a timely real-time basis.

SUMMARY OF THE INVENTION

In one aspect, the present invention provides a system and method for establishing the valuation of an asset, pricing the asset, acquiring the asset, and then measuring the profitability of that asset based on the established benchmarks for measurement as set by the risk bearer its affiliates and clients on a real time basis.

In another aspect of the present invention, a method of managing profitability of an insurance policy provided to a first client of a professional employer organization (PEO) is provided. In this method data relating to a PEO client is stored to a database, wherein the PEO client data includes employee class codes and employee geographic location for employees covered by the insurance policy and wherein the PEO client data is associated in the database with the Federal Employer Identification Number (FEIN) of the PEO client. In this method real-time payroll data is obtained from the PEO for the PEO client wherein the real-time payroll data is associated with the FEIN of the PEO client. Also in this method, real-time earned premium data is calculated for the insurance policy of the PEO client.

In yet another aspect of the present invention, a computer system for managing profitability of an insurance policy provided to a first client of a professional employer organization (PEO) is provided. This system includes a server for storing data relating to a PEO client to a database, wherein the PEO client data includes employee class codes and employee geographic location for employees covered by the insurance policy and wherein the PEO client data is associated in the database with the Federal Employer Identification Number (FEIN) of the PEO client. The server of this system obtains real-time payroll data from a server associated with a PEO for the PEO client wherein the real-time payroll data is associated with the FEIN of the PEO client. In this system the server calculates real-time earned premium data for the insurance policy of the PEO client.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF EXEMPLARY EMBODIMENTS

Figure 1:
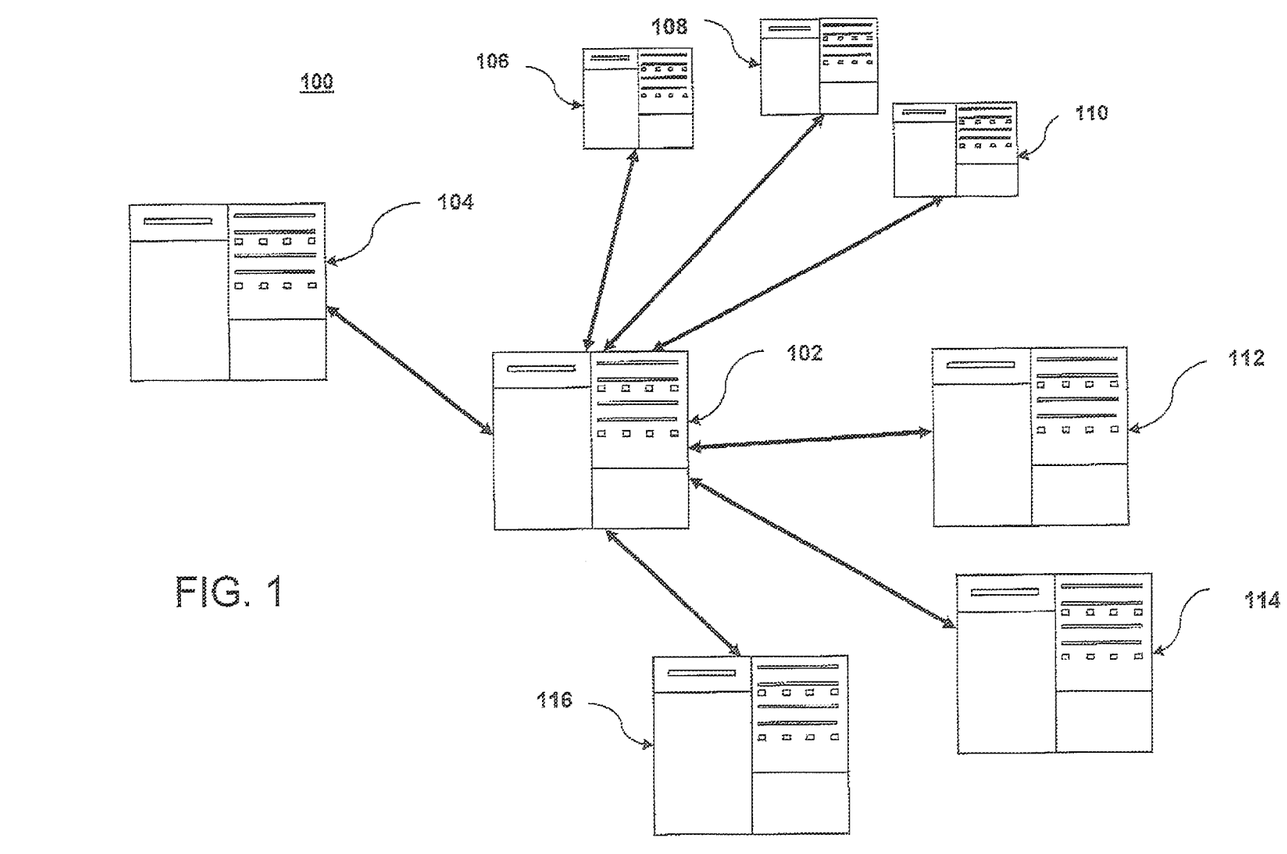
FIG. 1 is a system resource diagram depicting the resources utilized in a exemplary embodiment of the present invention.

Turning now to the drawings, and more particularly, to FIG. 1 thereof, there is depicted an overview of the system 100 of an exemplary embodiment of the present invention. The system 100 includes a server 102 operated by an entity tasked with evaluating insurance policies, claims, payroll, and risk data, as well as collecting data from insurance regulatory Bureaus such as the NCCI, and any other data pools deemed meaningful to the risk bearer, their affiliates and clients. This entity may also be tasked with evaluating profitability of policies by identifying and analyzing areas of rate inadequacy, loss trending, and jurisdictional and geographic factors that influence the cost to issue policies and pay for losses that arise as a result of a filed claim against the policy. The entity operating the server 102 can be a program manager performing the services of underwriting, collecting premiums, managing agents and processing audits for an insurance carrier. Server 102, as well as other servers described herein, include one or more processors, input and output devices for receiving and transmitting data and internal and/or external data storage devices. In addition, one or more visual display devices, including video monitors, projectors, touch screen devices and printers, can be employed in the system herein described.

Data is collected by the system 100 and integrated into server 102 using a number of methods. In an exemplary embodiment the data includes the use of a unique identifier, the Federal Employer Identification Number ("FEIN"), which allows all data associated with a particular client or asset to be attached, found, culled, and tracked by that specific identifier. Thus, all policy, payroll, claims, bureau, and other data as warranted and deemed meaningful by actuarial science is attached to the FEIN. The FEIN is a ubiquitous data point for the payroll, billing, policy, and claims systems and is the unique policyholder identifier. Thus, the system can use the FEIN to draw together both past and present data relating to a potential business asset of the risk bearer, their affiliates and clients from the various sources in managing profitability. As a result, references herein to an asset, policy, client or FEIN can be interchanged.

In the context of worker's compensation policies issued to Professional Employer Organizations, or PEOs, Server 102 gathers policy, payroll, bureau and claims data, for individual PEO client company's workers compensation policies from server 104 which can be maintained by an insurance carrier or third party that is contracted to service the policy. In alternate embodiments, server 102 and 104 can be maintained by the same entity and the hardware and software of these servers can be combined or distributed as appropriate for system resource management purposes.

In an exemplary embodiment, the system 100 can be utilized to automate the processes of valuing the risk for an asset or policy prior to binding; determining appropriate pricing for the policy; and benchmarking and managing profitability following issuance of the policy. Exemplary processes for performing each of these functions are provided below.

Figure 2:
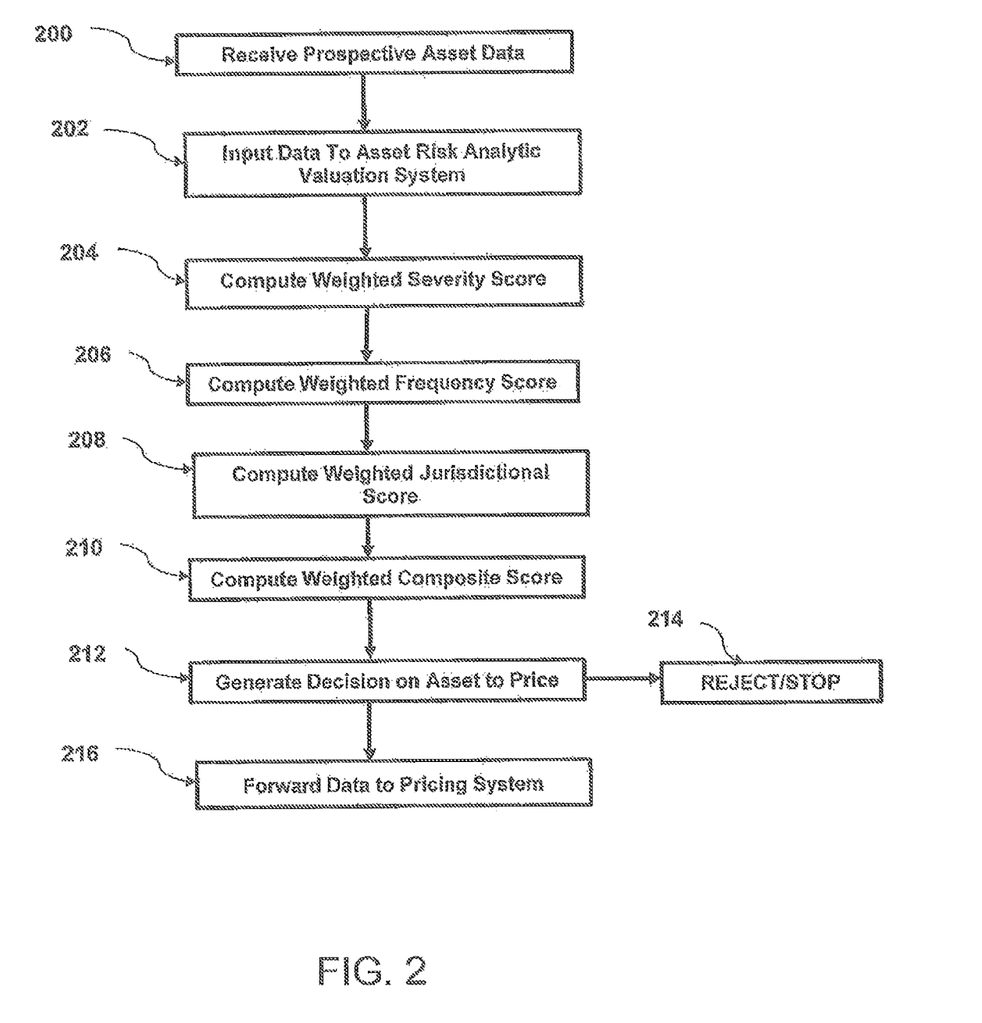
FIG. 2 is a flowchart of a process performed by the system of FIG. 1.

As depicted in FIG. 2, an exemplary process for valuing risk of a requested policy is provided. Data is received at step 200 and then input 202 to the processor 102 of FIG. 1. It should be understood that the data received at step 200 can be provided through a physical insurance application form and entered into processor 102 by means of an input device, such as a scanner or keyboard, or transmitted to the system by electronic means. The data provided includes information such as that provided via standard insurance application forms such as those provided by ACORD, historical loss information as provided by both current and past risk bearers, and other pertinent data necessary to the valuation process. In the context of worker's compensation, for example, this would include such information as the type of business the asset is in, what the employees of the asset perform for the business on a daily basis (known as the class code and as defined by the applicable bureaus), the locations where the asset operates, data associated with the specific locations of the asset, the number of employees and associated payrolls on a per class code and jurisdiction basis, sales and revenue data, and importantly, the FEIN. Information received at step 200 would also include payroll data and insurance class codes for each employee.

Following input of this data a feature of the present system and process is to generate a composite risk tolerance valuation score for an asset applying for a policy 204. The composite score can be used to determine whether a policy falls within a risk bearers risk profile and thus should be underwritten by a particular risk bearer, and allows for the system to select the appropriate risk bearer based on the scores and factors processed through the system. The composite score is derived from a computed weighted severity score 206, a computed weighted frequency score 208 and a computed weighted jurisdictional score 210. The method of computing each of the weighted scores and composite score will now be described.

In an exemplary embodiment, the weighted severity score is a measure of the of the potential of an asset to produce severity based losses which specifically effects the risk bearer's, their affiliate's and client's profitability measures. In an exemplary embodiment, and utilizing workers compensation as an example, the severity of risk for each employee to be covered by a policy is computed using the AM Best Hazard Index 1-10, the NCCI Hazard Grade A-G and a Propensity for Loss in Excess of $250,000 calculated using an itemization of all losses in the system between $250,000 to $10,000,000 in order to measure propensity of loss. A suitable starting point for such calculations would be the Reveal™ Excess Pricing from the Guy Carpenter company.

The AM Best Hazard Index was developed to identify the relative degree of risk for insurance coverages in each classification. For each line of insurance the number given is an indication of hazard (Low 1-3, Medium 4-6, High 7-9, and Very High 10). The numbers are based on a review of research material AM Best has collected, the opinions of reviewers who have read and commented on the reports in draft stage, the opinions of AM Best's in-house technical consultants and a review of similar or related classifications. In computing the weighted severity score and composite score, the severity scoring based on the AM Best Hazard index is scaled to 100% by dividing 100% by 10 and multiplying by the indication of hazard number. In an exemplary embodiment, scorings up to 59% based on the AM Best Hazard Index are considered desirable, 60-80% are considered acceptable and 90-100 undesirable.

Similarly, NCCI assigns each class code to a Hazard Group. Hazard groups capture the variation in large loss potential among class codes. NCCI currently categorizes class codes into seven hazards groups labeled A-G. Class codes in Hazard Group A have the least likelihood of large loss and class codes in Hazard Group G have the greatest likelihood of a large loss. In order to compute the weighted severity score and composite score, the severity scoring based on the NCCI Hazard Grade is scaled to 100% by dividing 100% by 7 and multiplying by 1 for an A score, 2 for a B score, 3 for a C score, and so on up to 7 for a G score. In an exemplary embodiment, scorings up to 57% are considered desirable, 58-78% are considered acceptable and 79-100% are considered undesirable.

Propensity for Excess Loss is a calculation based on the NCCI Hazard grade that determines the percentage of expected loss in a class code compared to the state's average loss between $250,000 and $10,000,000. The propensity score is determined by taking the median average of lost dollars by state and dividing that by the individual class code losses and is provided on a scale of −50% to +50%. In an exemplary embodiment, scorings up to −5% are considered desirable, −5% to +5% are considered acceptable and scores above +5% are considered undesirable. In order to compute the weighted severity score and composite score, the Propensity For Loss in Excess of $250,000 is scaled to 100% by adding 50% to the Propensity for Loss score such that a −50% Propensity for Loss score equates to 0% and a +50% Propensity for Loss score equates to 100%.

The weighted severity score is then computed as the average over all employees to be covered by the policy of the sum of 30% of the AM Best severity score, 30% of the NCCI Hazard Grade score and 40% of the scoring of propensity for excess loss over $250,000. As can be readily seen, the relative desirability or undesirability of a policy can also be determined from the relative weightings.

In an exemplary embodiment the weighted frequency score is computed using "Bureau Loss Ratio" data and "Bureau Claims Frequency" data. Bureau Loss Ratio data are the 5-year loss ratios from NCCI and the independent bureaus of Wisconsin, Pennsylvania, New Jersey, Minnesota, Michigan, Massachusetts, Delaware, New York, and California by code and jurisdiction. Currently, most data ranges from 2004-2010 with $12.4 Trillion in Payroll and $291 Billion in on-level manual premium. In order to compute the weighted frequency score and composite score in this exemplary embodiment, the Bureau Loss Ratio is capped at 100%, i.e., loss ratios above 100% are treated as being 100%. In an exemplary embodiment, Bureau Loss Ratios up to 65% are considered desirable, 65-80% acceptable and over 80% undesirable. In order to scale the loss ratio to 100% for purpose of the weighted frequency score and composite score, the loss ratio is inverted such that a 100% loss ratio is equated to 0% and a 0% loss ratio is equated to 100%.

The Bureau Claims Frequency is a calculation of the claims per $1 Million in Payroll over a 5-year period as measured by NCCI and the independent bureaus of Wisconsin, Pennsylvania, New Jersey, Minnesota, Michigan, Massachusetts, Delaware, New York, and California by code and jurisdiction. Most data ranges from 2003-2009 with $12.4 Trillion in Payroll and $291 Billion in on-level manual premium. In order to compute the weighted frequency score and composite score in this exemplary embodiment, the Bureau Claims Frequency is capped at 9 claims per $1 Million, i.e., claims in excess of 9 per $1 Million are treated as 9 claims per $1 Million. In an exemplary embodiment, Bureau Loss Ratios up to 2 are considered desirable, 3-4 acceptable and over 4 undesirable. The Bureau Claims Frequency data is then scaled to 100%, for purposes of calculating weighted frequency score and composite score using the formula 100% minus the product of 100% divided by 9 multiplied by the Bureau Loss Claim number. For purposes of clarity, a Bureau Loss Claim number of 2 would be scaled to 77.8%, a Bureau Loss Claim number of 6 would be scaled to 33.3%, and a Bureau Loss Claim number of 9 or above would be scaled to 100%.

The weighted frequency score is then computed as the sum of 50% of the Bureau Loss Ratio score and 50% of the Bureau Claims Frequency Score averaged over all of the employees to be covered by a policy.

In an exemplary embodiment, the weighted jurisdictional score is a scale of 1 to 5 that the insurance carrier assigns to a state based on the desirability to insure in that state. Criteria used in determining ranking can include favorability of workers' compensation law, ease of adjusting, litigation rates, and carrier profitability. In order to compute the composite score, the jurisdictional score is scaled to 100% by dividing 100 by 5 and multiplying by the assigned state score. In an exemplary embodiment, jurisdictional scores up to 30% are desirable, scores over 30% and up to 40% are acceptable and scores over 40% are considered undesirable. The weighted jurisdictional score is the average of the jurisdictional scores for all employees to be covered by a policy.

In an exemplary embodiment, the composite score is then computed 210 as the sum of 30% of the weighted severity score, 30% of the weighted frequency score and 40% of the weighted jurisdictional score. In an exemplary embodiment, composite scores up to 40% are considered undesirable and thus, policies having such scores can be rejected 214. Policies having composite scores above 60% are considered desirable and thus, a decision to bind such policy can be made and the policy forwarded on for pricing 216. For policies having composite scores between 40% and 60% these are considered acceptable in an exemplary embodiment and the decision to reject 214 or price 216 can then be made based upon additional objective factors such as prior claims history for the client, premium amounts and the number of existing "acceptable" policies bound by the risk bearer. As will be readily understood, using the system and process described herein, the determination whether to bind a policy 212 can thereby be automated.

It should be recognized that the weighting of each of the inputs to the composite score can be adjusted based upon such factors as the nature of insurance to be provided and the risk profile of an individual risk bearer. In addition, additional benchmarks that can be adjusted to attain desired profitability measures using the system and methods described herein include desired return on investment, desired loss ratio, desired expense ratio desired return on equity and desired return on surplus. It should also be recognized that in addition to the composite score, the relative desirability of a policy can be computed from the desirability rankings of the individual components of the composite score.

It should be understood that the dividing points for rating policies as undesirable, acceptable and desirable based upon the exemplary computations of weighted severity score, weighted frequency score, weighted jurisdictional score and composite score described above have been found to be particularly advantageous. Nonetheless, it is intended that these dividing points be adjusted such as for the purpose of accommodation of individual risk profiles of carriers.

Figure 3:
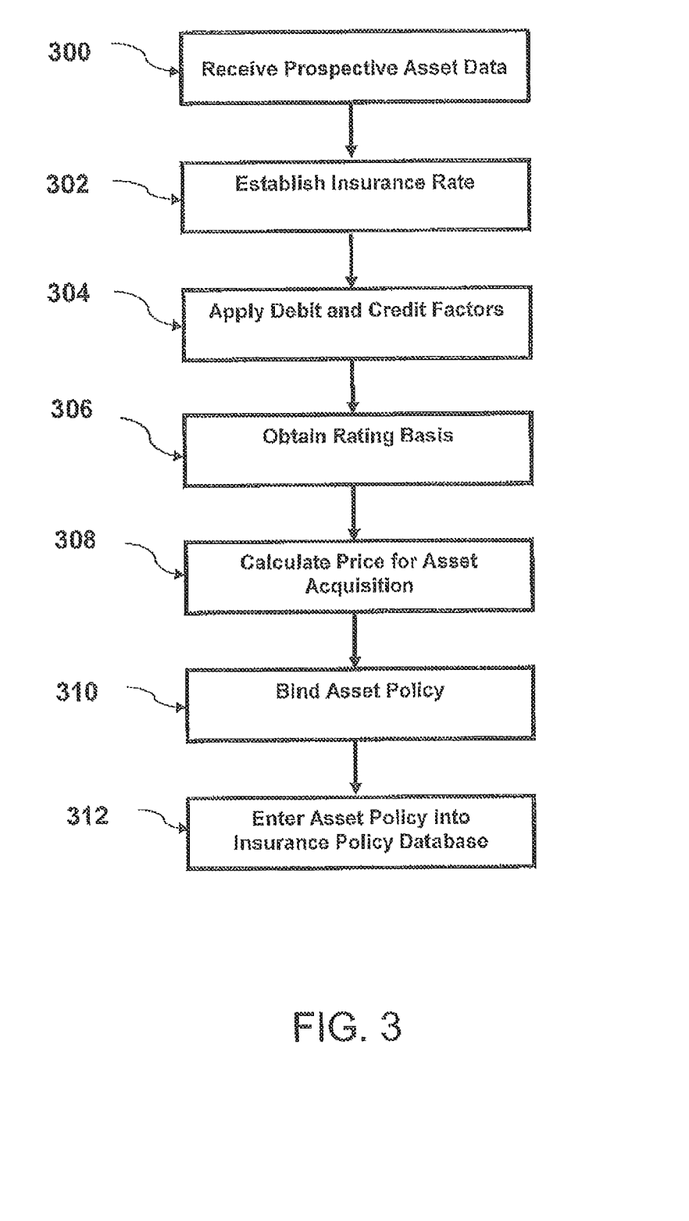
FIG. 3 is a flowchart of a process performed by the system of FIG. 1.

Following the valuing process of FIG. 2, the process of pricing the policy can then be carried out by system 100 of FIG. 1 utilizing the process now described in connection with FIG. 3. In pricing a policy to be bound, data relating to the policy is first received by the system 300. The data received by the system can include data forwarded 216 as the output of the valuing process of FIG. 2. Data in addition to that provided by the valuing process may also be obtained and used in selecting the appropriate risk bearer and then computing pricing of a policy. Examples of such data include Insurance Rate data 302, Debit and Credit Factors 304 and Rate Basis information 306. Utilizing the foregoing data the price of a policy to be bound can be calculated utilizing standard pricing formulas 308.

Following the pricing of a policy 308 the policy is bound and issued 310 and may then be entered into a database of policies forming the portfolio of assets of a risk bearer 312, their affiliates and clients. The database of policies may be associated and integrated with the server of the risk bearer 104 or the server of a program manager 102. Thus, FIGS. 2 and 3 outline the initial entry of asset data into the system, how the system evaluates the data in conjunction with a set of profitability benchmarks and applies actuarial analytics and predictive modeling to the asset, and how the asset will be valued and ultimately priced as a result of the processing of the data associated with the asset to the established profitability benchmarks.

Figure 4:
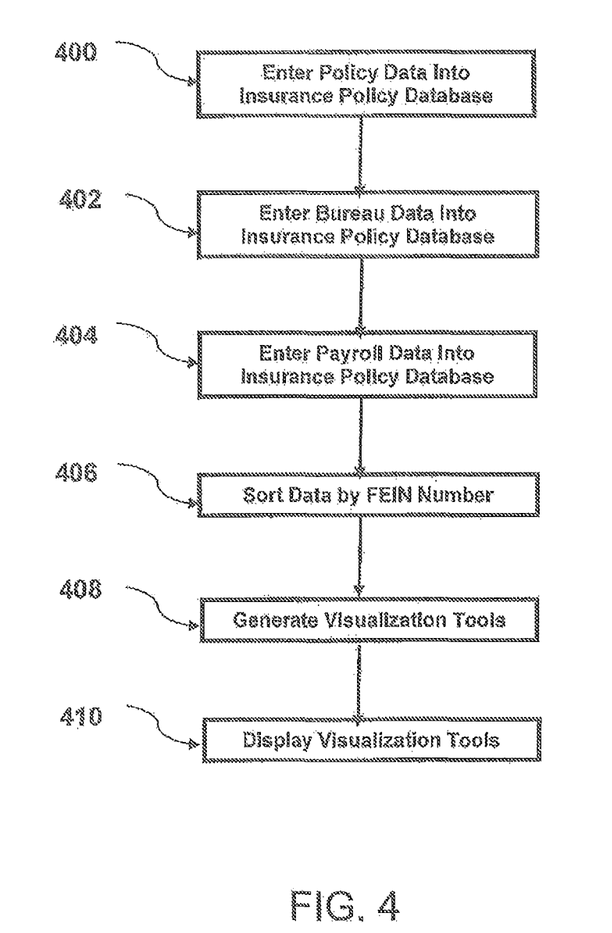
FIG. 4 is a flowchart of a process performed by the system of FIG. 1.

Following issuance of a policy, the system of FIG. 1 can be used to manage the performance and ultimately the profitability of that policy in a manner that was not heretofore possible. In order to manage performance and profitability, data regarding the asset is stored in a database 400 associated with or accessible by server 102. In an exemplary embodiment, this data can be provided and is compared and measured to the established benchmarks set by the risk bearer, their affiliates and clients. The output of the automated asset and risk valuation model, the pricing module and additional data can also be stored in the database which is associated with server 102 or is accessible thereby. This additional data can include, for example, data provided by one or more of the appropriate and governing insurance Bureau's such as NCCI 402.

Where the policy database is associated with server 102, server 102 further gathers data directly from insurance clients 106, 108 and 110 of FIG. 1, including real-time payroll data 404 as well as insurance class codes, rates, and other applicable factors to include credits, debits, and experience modification factors, where applicable, needed to adequately price an insurance policy. In the exemplary application to workers compensation insurance provided to PEO's, the PEO will be providing payroll services to its clients and thus, real-time payroll data is available to server 102 to provide perform profitability calculations.

In an exemplary embodiment, additional information is also collected from the clients 106-108 and 110 including by server 102, for example, employee names, locations, number of employees, and the mandatory identifier, the FEIN. Where the policy database is associated with the server of the risk bearer 104, server 102 also collects this data in order to manage the performance of the assets and the associated issued policies in the portfolio and in accordance with the established benchmarks of the risk bearer, their affiliates and clients.

In addition to information relating to a particular client, server 102 can also draw information from additional sources 112, 114 and 116, in order to measure and analyze both asset and overall portfolio profitability applying the established benchmarks with the risk bearer, their affiliates and clients based on individualized risk profiles by utilizing a much broader dataset than is available from an individual client's loss history. For example, the profitability of an individual policy can be evaluated against the data having the same class codes and geographic location from the broader data set reported to actuarial bureaus.

From this evaluation it can be determined how actual profitability is measured utilizing current data that compares it to the established risk bearer, profitability benchmarks for that assets risk profile to include severity, frequency, and jurisdictional measures. As can be readily understood, the ability to determine the profitability of an individual policy on a payroll cycle basis, and evaluate that against expected profitability, allows for improved management of the risk bearer's, their affiliates, and clients portfolio of assets in accordance with the established profitability measures in a manner much more quickly and efficiently then current methods.

As an example to the measurement of operational profit for a risk bearer, their affiliates and clients, a primary insurance carrier utilizes the combined ratio method. The International Risk Management Institute ("IRMI") defines the combined ratio of an insurance carrier as the sum of two ratios, the loss ratio, which is calculated by dividing incurred losses plus loss adjustment expense (LAE) by earned premiums (the calendar year loss ratio), and the other, the expense ratio, which is calculated by dividing all other expenses by either earned premiums (i.e., trade basis or statutory basis expense ratio). When applied to a company's overall results, the combined ratio is also referred to as the composite or statutory ratio. Used in both insurance and reinsurance, a combined ratio below 100 percent is indicative of an underwriting profit, a combined ratio greater than 100 percent is indicative of an underwriting loss and a combined ratio of exactly 100 percent is indicative that every premium dollar is being used to pay claims and cover operating costs with nothing remaining for insurer profit. Furthermore, the cost containment of all expenses in the system yields a greater return on investment (ROI) for the risk bearer, their affiliates and clients. Such expenses include but are not limited to taxes, commissions, legal, managed care, surveillance, reinsurance charges, and insurance charges.

A more concise definition that can be used to get to the same measurement is that Combined Ratio=Expenses (administrative cost, profit, reinsurance, cost to adjudicate claims, taxes, commissions and other set costs)+Expected Losses (Broken out by wage loss, medical and cost containment expenses)/Actual Earned Premiums (Premiums derived from payrolls by workers' compensation classification code by state)+Other Income (i.e., investment return in reserves not yet paid). In order to establish a return on surplus of 15% an insurance carrier needs to deliver a combined ratio less than 95%.

The total after tax return to the risk bearer (T) is equal to the sum of investment return on assets (I/A) where I is the investment gain or loss and A is the total assets, multiplied by an insurance leverage factor (1+R/S) dependent on the size of reserves relative to surplus, where R is the reserves and other liabilities (excluding equity in unearned premium reserves) and* S is the stockholders equity (capital, surplus, and equity in unearned premium reserve), plus the underwriting profit (or minus the underwriting loss) on premiums (U/P), where U is the underwriting profit and P is the premium income, multiplied by an insurance exposure term (P/S) relating premiums to surplus.

The formula does not require a mutually exclusive choice between investment or total assets as an investment base but rather points out their interdependence. The formula contains a third rate of return measure in the form of the U/P ratio, a familiar and traditional benchmark for measuring underwriting results. This is meant to show the relationship among return on investment, return on assets, and return on sales.

It can be readily understood that utilizing actual payrolls, rather than estimated payrolls, to calculate actual premiums, rather than estimated premiums allow for the ability to measure actual profitability, rather than estimated profitability of a client policy in an extremely efficient and timely manner when compared to current methods of having to wait for periods of a minimum of 15 up to 18 months after a policy's inception. These scenarios can be measured by server 102 by understanding actual payrolls and premiums by payroll cycle rather than relying on data reported to actuarial bureaus over a year earlier. It will also be readily recognized that using the system and method of the present invention will determine and provide more accurate information regarding the profitability of an asset within the portfolio as well as the entire portfolio of assets.

Through use of the presently described system, data can be provided to risk bearers, their affiliates and clients in ways that assist in managing risk such as by identifying geographic areas experiencing undesirable profitability scenarios such as high loss ratios and low returns on equity. Data for each client is stored in a data warehouse and linked by the FEIN. Thus, the FEIN is particularly useful in sorting and culling the data 406 to generate visualization tools 408. These visualization tools are then displayed to users for managing policies.

Figure 5:
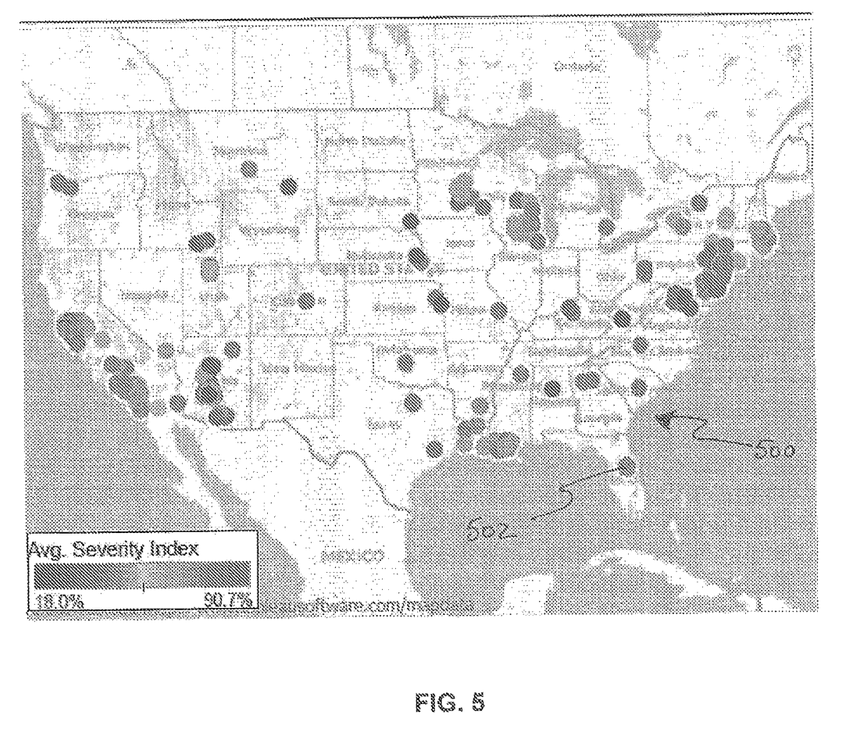
FIG. 5 is a screenshot of a visualization tool generated and displayed by the system of the FIG. 1.

As a result of the currency of data being utilized in the present system, visualization tools can be particularly helpful in managing the performance and profitability of a portfolio of assets. For example, as shown in FIG. 5 a geographic map of coverage areas 500 can be presented to a user with policies represented by circles 502 colored to correspond to severity ranking according to the desirable, acceptable and undesirable paradigm selected for a risk bearer. Additionally, the size of the circles corresponds with the size of the asset being measured. Size can correspond to but is not limited to the size of an assets payroll, premiums, claims costs, and employee counts.

Using such a map, risk bearers, their affiliates and clients can both easily and quickly identify potential outliers that can impact the performance and ultimate profitability of an asset or portfolio of assets. Examples would be identifying where policies have potential unacceptable severity exposures and associated costs, where they may have potential frequency outliers that can drive claims costs, and where they may have poor jurisdictional measures such as loss ratios and return on equity that will affect the overall profitability of the asset and portfolio, As will be readily understood, the combination of reliance on real-time payroll, claims, and policy data to compute severity rankings combined with the visualization of these rankings geographically can allow a manager to identify clumping of underperforming assets. Such clumping may indicate, for example, a jurisdiction to be avoided in acquiring new assets and binding new policies, or an area in need of mitigation or reduction efforts such as loss control, risk management, safety training, claims costs analysis, and reserve setting.

In alternative embodiments, the circles can provide links to data identifying the individual client associated with that circle as well as providing links to data relating to the severity ranking or any other data associated with the client. The size of the red dot can also be scaled based upon the relative percentage of the current loss over projections.

Figure 6:
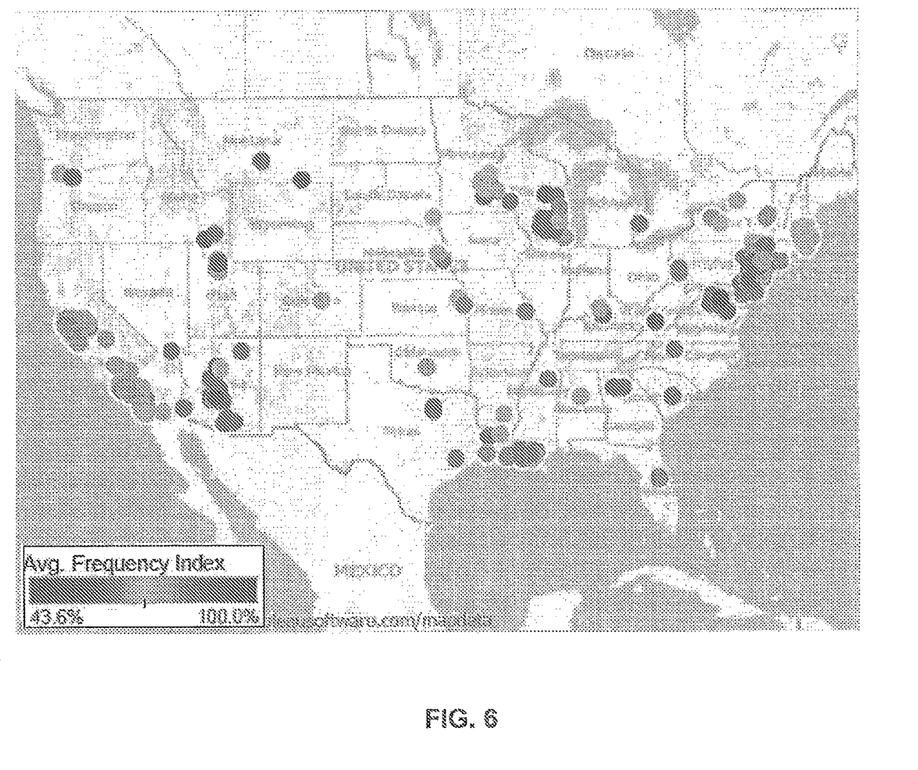
FIG. 6 is a screenshot of a visualization tool generated and displayed by the system of the FIG. 1.
Figure 7:
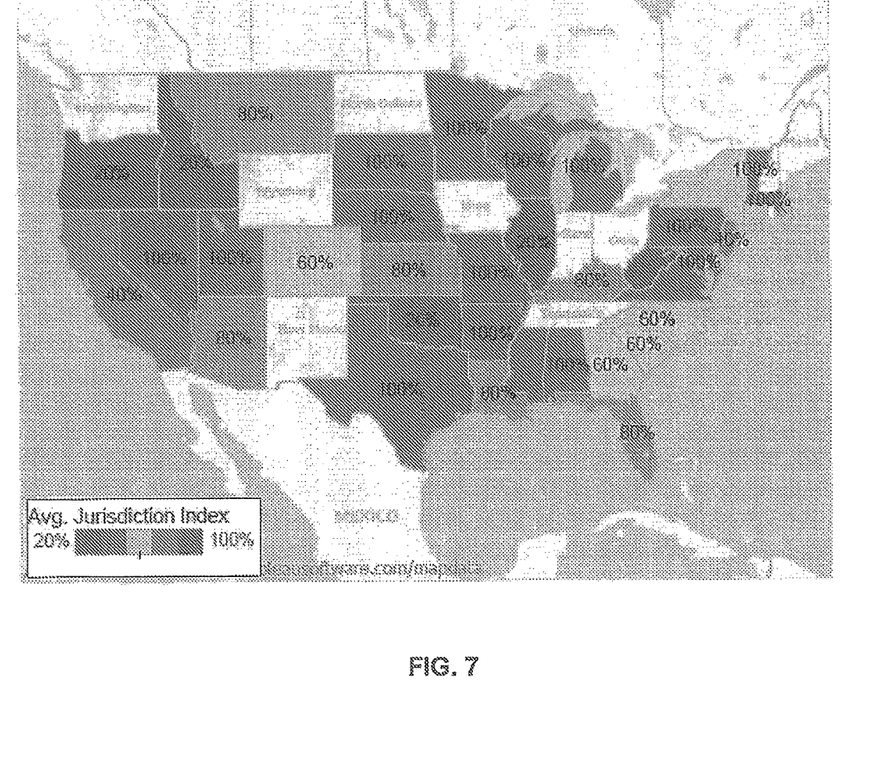
FIG. 7 is a screenshot of a visualization tool generated and displayed by the system of the FIG. 1.
Figure 8:
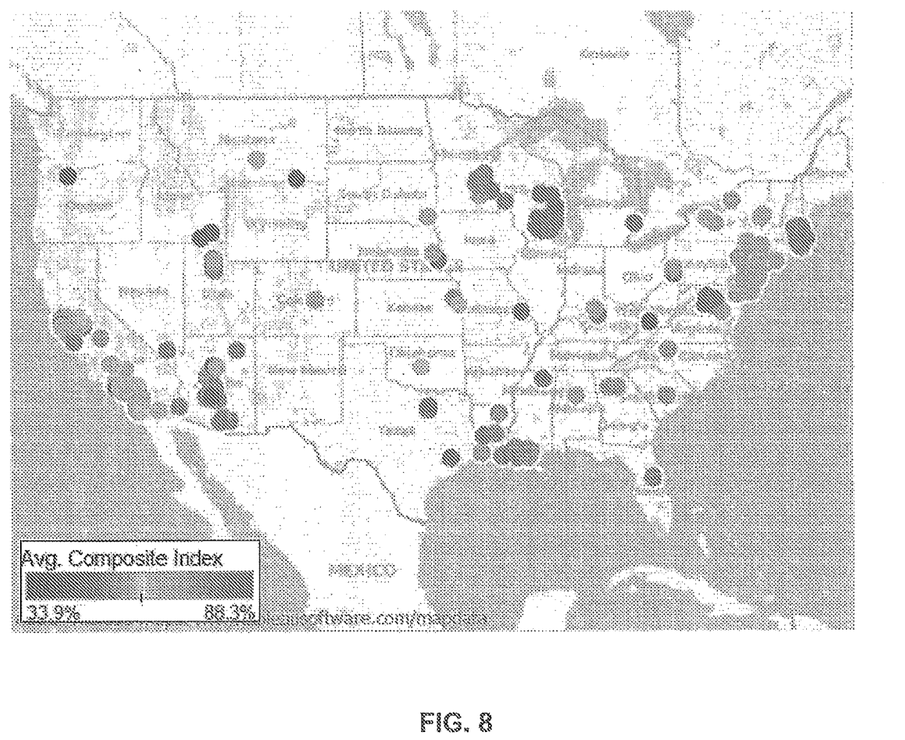
FIG. 8 is a screenshot of a visualization tool generated and displayed by the system of the FIG. 1.

FIGS. 6-8 provide additional geographic visualization tools generated utilizing weighted frequency scores, weighted jurisdiction scores and composite scores all generated utilizing real-time payroll, claims and policy data. As with the geographic representation of severity scores in FIG. 5, the geographic representation of frequency, jurisdiction and composite score data can be utilized to manage a risk bearer profitability in real-time.

Figure 9:
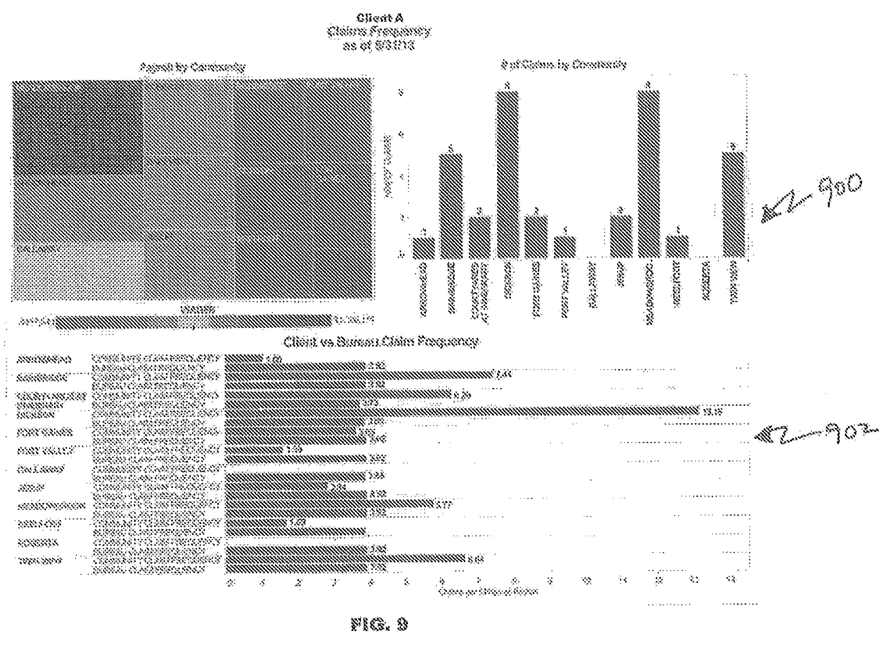
FIG. 9 is a screenshot of a visualization tool generated and displayed by the system of the FIG. 1.
Figure 10:
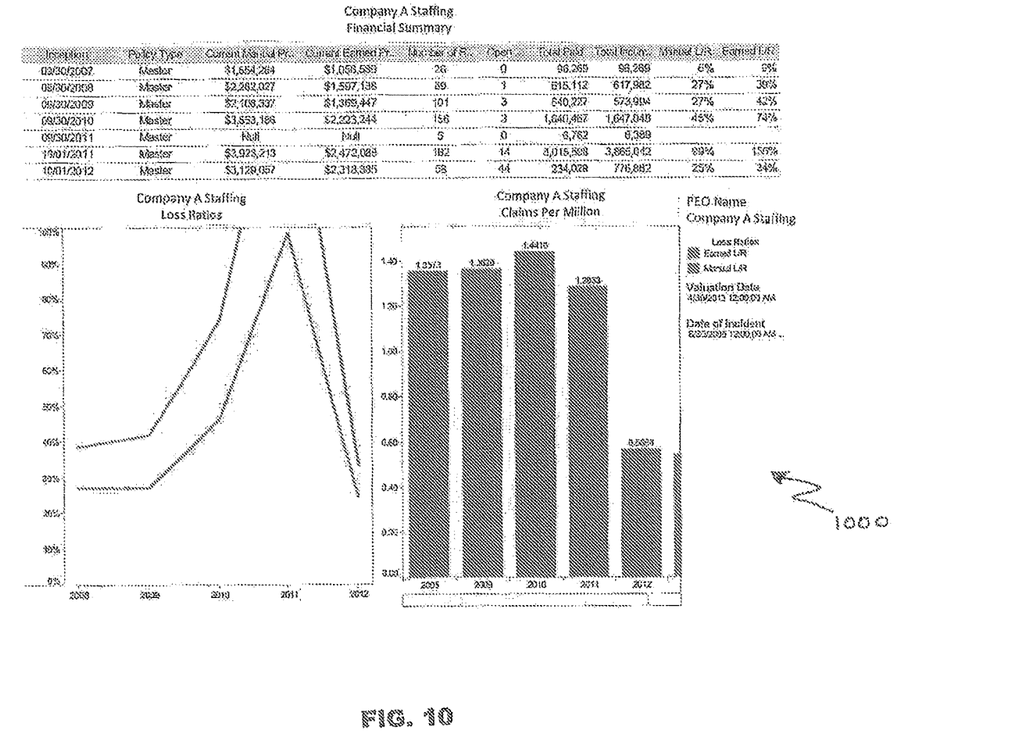
FIG. 10 is a screenshot of a visualization tool generated and displayed by the system of the FIG. 1.

It should be readily recognized that the geographic representation of data in FIGS. 5-8 are exemplary and that such data may alternatively be provided in the form of gauges, views, graphs, charts, reports, and most importantly alerts as deemed useful by a particular risk bearer, their affiliates and clients and in correlation with their specific established benchmarks for profitability measurement and identification. For example, as depicted in FIG. 9, a screenshot is provided of an exemplary dashboard of claim frequency data 900. As seen in FIG. 9, claims frequency data can be provided for workers compensation policies using current payroll data in a number of formats including a bar graph 902 displaying the claim frequency of the client in a particular jurisdiction computed using current payroll data alongside the claims frequency as computed using the most recent Bureau data which, as noted above, is potentially 18 months stale Another exemplary visualization tool is presented in FIG. 10 in which is displayed a screenshot of a dashboard of data for an exemplary PEO. It should also be readily recognized that the system of FIG. 1 can be used to provide reports and alerts to clients based upon the real-time data provided by clients. For example, the system may be configured to send an alert to a program manager when the current pay-roll data provided by clients causes the workers compensation policies of 5 or more clients in a single ZIP code to become unprofitable.

It will be recognized that the processes described herein can be carried out by means of computer programs and the programming of specific yet unlimited algorithms that are stored in the identified servers or stored in other computer readable media accessible by the identified servers and an vast number of data pools from which an unlimited number of algorithms can be developed and utilized for analysis and measurement purposes. One or more programs stored on one or more servers and/or computer readable media can operate cooperatively to perform the processes described herein.

Although the system presented herein has been described in terms of a specific number of servers and databases, it should be understood that any number of servers and databases can be utilized in practicing the present system, and the systems ability to pull data from numerous data sources, cull and organize the data, then apply algorithms to allow the servers to manipulate and ultimately display the data in a very concise format and view is part of the system and ultimately the inventions unique and proprietary characteristics. It is also possible to combine the functions of various servers without departing from the spirit and scope of the present invention.

Moreover, unless specifically called out, the description of processes performed by the system of the present invention in a particular order is not intended to suggest that this order is required. Thus, any reordering of the steps of the process that achieves the stated purpose may be performed and yet another unique and proprietary feature to the system and invention's ability to adapt to all of the ongoing changes within the environment that it serves.

Where the system and processes described herein have been described for use in connection with a particular type of insurance policy this has been done to provide a context for aiding in understanding those systems and processes. It is not intended that the systems and processes be limited in their application to a particular type of insurance. The system is utilized in measuring profitability factors for risk bearers, their affiliates and clients for other lines of insurance such as general liability, employment practices liability, auto, property, disability, and major medical and other health insurance coverages, to name a few.

Additionally, where the system and processes described herein have been described for use in connection with a particular type of industry, it should be reasonably understood that the system can also be used in other industries such as legal, managed care, aviation, real estate, and healthcare.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method of managing profitability of at least one insurance policy provided to a professional employer organization (PEO) having a plurality of PEO client companies insured thereunder through extension of the at least one insurance policy, the method comprising the steps of:
   (a) storing data relating to the plurality of PEO clients to a database, wherein the PEO client data includes employee class codes and employee geographic location for employees covered by the at least one insurance policy and wherein the PEO client data is stored in the database based upon respective associated Federal Employer Identification Numbers (FEINs) of the plurality of PEO clients;
   (b) obtaining real-time payroll data from the PEO for the plurality of PEO clients wherein the real-time payroll data is associated with respective FEINs of the plurality of PEO clients;
   (c) dynamically calculating, in real-time, earned premium data for the at least one insurance policy of each of the plurality of PEO clients;
   (d) dynamically calculating, in real-time, a severity ranking based upon the calculated earned premium data for the plurality of PEO clients;
   (e) dynamically calculating, in real-time, a color value from among a range of color values corresponding to a range of severity rankings based upon the calculated severity ranking;
   (f) dynamically calculating, in real-time, an indicator scaling factor corresponding to a size of the at least one insurance policy for the plurality of PEO clients;
   (g) dynamically displaying, in real-time, a geographic map of policy coverage areas on a display including respective dynamic indicators each having a size based upon the indicator scaling factor and a color based upon the calculated color value; and
   (h) repeating, in real-time, on an on-going basis, steps (b)-(g) to dynamically update the size and color of each of the dynamic indicators in real-time based upon real-time changes in the calculated real-time earned premium data.

2. The method of claim 1 further comprising the step of dynamically calculating, in real-time, profitability for each employee covered by the at least one insurance policy of each of the plurality of PEO clients by computing the Combined Ratio using the earned premium data for the plurality of PEO clients.

3. The method of claim 2 further comprising the step of dynamically calculating, in real-time, aggregate profitability for the at least one insurance policy provided to each of the plurality of PEO clients.

4. The method of claim 2 wherein each of the dynamic indicators corresponds to the aggregate profitability of the at least one insurance policy for all employees of each of the plurality of PEO clients that are located in the same ZIP code.

5. The method of claim 2 wherein the at least one insurance policy comprises a plurality of insurance policies.

6. The method of claim 5 wherein the severity rankings correspond to profitability for the plurality of insurance policies covering employees of each of the plurality of PEO clients.

7. The method of claim 6 wherein the severity rankings correspond to the aggregate profitability for the insurance policies for all employees of each of the plurality of PEO clients covered by the policies that are located in the same ZIP code.

8. A computer system for managing profitability of at least one insurance policy provided to a professional employer organization (PEO) having a plurality of PEO client companies insured thereunder through extension of the at least one insurance policy, the system comprising:
   a server for storing data relating to the plurality of PEO clients to a database, wherein the PEO client data includes employee class codes and employee geographic location for employees covered by the at least one insurance policy and wherein the PEO client data is stored in the database based upon respective associated Federal Employer Identification Numbers (FEINs) of the plurality of PEO clients;
   the server (a) obtaining real-time payroll data from a server associated with a PEO for the plurality of PEO clients wherein said real-time payroll data is associated with respective FEINs of the plurality of PEO clients, (b) dynamically calculating, in real-time, earned premium data for the at least one insurance policy of each of the plurality of PEO clients, (c) calculating, in real-time, a severity ranking based upon the calculated earned premium data for the plurality of PEO clients, (d) dynamically calculating, in real-time, a color value from among a range of color values corresponding to a range of severity rankings based upon the calculated severity ranking, (e) dynamically calculating, in real-time, an indicator scaling factor corresponding to a size of the at least one insurance policy for the plurality of PEO clients, (f) dynamically displaying, in real-time, a geographic map of policy coverage areas on a display including respective dynamic indicators each having a size based upon the indicator scaling factor and a color based upon the calculated color value, and (g) repeating, in real-time, on an on-going basis, steps (a)-(f) to dynamically update the size and color of each of the dynamic indicators in real-time based upon real-time changes in the calculated real-time earned premium data.

9. The system of claim 8 wherein the server dynamically calculates, in real-time, profitability for each employee covered by the at least one insurance policy of each of the plurality of PEO clients by calculating the Combined Ratio using the earned premium data for the plurality of PEO clients.

10. The system of claim 9 wherein the server dynamically calculates, in real-time, aggregate profitability for the at least one insurance policy provided to each of the plurality of PEO clients.

11. The system of claim 9 wherein each of the dynamic indicators corresponds to the aggregate profitability for the at least one insurance policy for all employees of each of the plurality of PEO clients covered by the policy that are located in the same ZIP code.

12. The system of claim 9 wherein the at least one insurance policy comprises a plurality of insurance policies.

13. The system of claim 12 wherein the severity rankings correspond to profitability for the plurality of insurance policies covering employees of each of the plurality of PEO clients.

14. The system of claim 13 wherein the severity rankings correspond to the aggregate profitability for the insurance policies for all employees of each of the plurality of PEO clients covered by the policies located in the same ZIP code.

15. The system of claim 8 wherein the server dynamically calculates, in real-time, the severity ranking based upon a weighted severity score, a weighted frequency score and a weighted jurisdictional score relating to the at least one insurance policy.

16. The system of claim 15 wherein the server dynamically calculates, in real-time, the severity ranking based upon a composite score relating to the at least one insurance policy from the weighted severity score, weighted frequency score and weighted jurisdictional score.

17. The system of claim 16 wherein the server dynamically calculates, in real-time, a price for the at least one insurance policy where the composite score exceeds a preselected threshold.

\* \* \* \* \*